March 13, 1962    J. C. WINSLOW ETAL    3,024,673
DEPTH CONTROL MEANS FOR PORTABLE POWER DRILLS AND THE LIKE
Filed Aug. 17, 1959
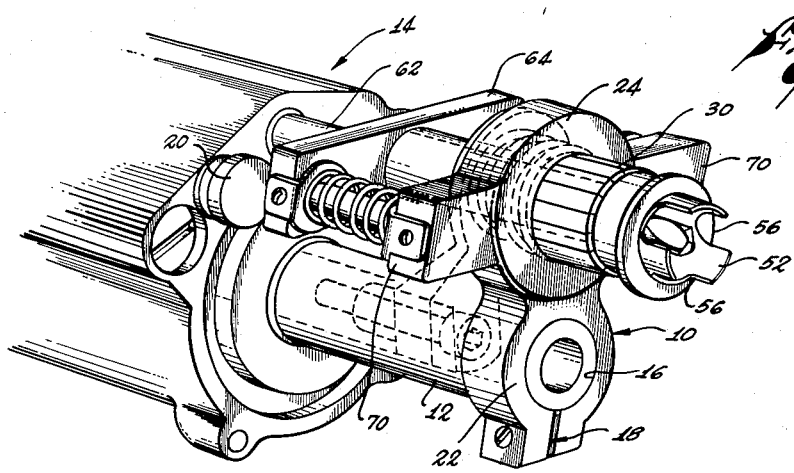
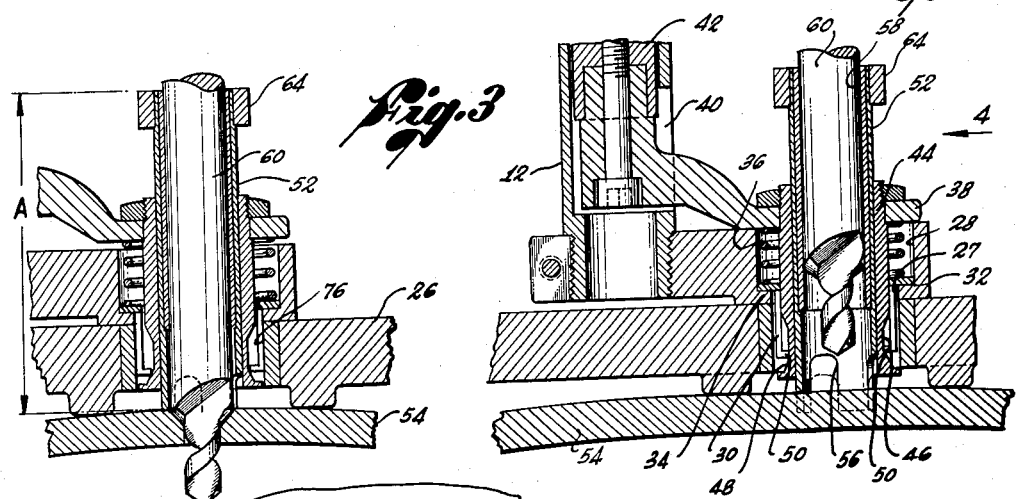
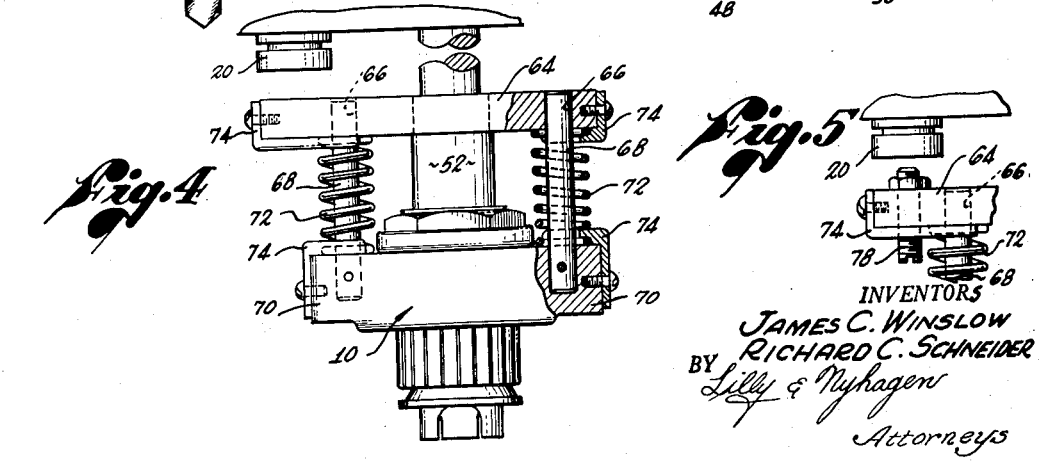
INVENTORS
JAMES C. WINSLOW
RICHARD C. SCHNEIDER
BY Lilly & Nyhagen
Attorneys United States Patent Office 3,024,673
Patented Mar. 13, 1962

3,024,673
DEPTH CONTROL MEANS FOR PORTABLE
POWER DRILLS AND THE LIKE
James Carl Winslow, Sierra Madre, and Richard C. Schneider, Pasadena, Calif., assignors to Winslow Product Engineering Corporation, Arcadia, Calif., a corporation of California
Filed Aug. 17, 1959, Ser. No. 834,137
9 Claims. (Cl. 77—55)

This invention deals generally with portable rotary power tools, such as portable power drills, and particularly with a depth control means for tools of this type.

Stated briefly, the invention is concerned with attaining accurate depth control with portable power drills and the like, especially in certain situations where accurate depth control has heretofore been difficult or impossible to achieve.

One such situation arises in the case of drilling with a template. In the past, the usual practice was to use the upper face of the template as a reference surface for depth control purposes. This proved to be unsatisfactory, however, where extreme accuracy was required since the accuracy of the depth control was dependent on the spacing between the surface of the work and the upper face of the template and this spacing could not be accurately held.

A second situation in which accurate depth control is difficult to achieve is where the work surface is curved. In this case, depth control must be gauged from a point on the work surface immediately adjacent to the contact of the cutting bit with the work.

A general object of this invention is to provide a unique depth control means for portable power drills and the like.

A more specific object of the invention is to provide a depth control means for portable power drills and the like which is especially adapted to attaining accurate depth control when drilling with the aid of templates and drill jigs or in curved workpieces.

A further object of the invention is to provide a depth control means for portable rotary power tools which furnishes a guide for the cutting bit as well as a depth stop for the power tool.

Yet a further object of the invention is to provide a depth control means of the character described which is relatively simple in construction, inexpensive to manufacture and otherwise ideally suited to its intended uses.

Other objects, advantages and features of the invention will become apparent as the description proceeds.

Briefly, the objects of the invention are attained by providing a depth control means equipped with a main body part having a forward face presentable toward a workpiece and a bore on a fore and aft axis of the part to receive the cutting bit of a rotary power tool. Slidably mounted in this body part proximate to and parallel to the axis of the bore is a depth sensing means or depth stop of preset length. The forward end of the stop is extendible into contact with the workpiece and the rear end of the stop is engageable with the portable power tool to limit forward movement of its cutting bit in the bore.

In the illustrative form of the invention, the body part comprises a pressure foot to be mounted on a portable power drill of the type disclosed in copending application Serial No. 627,213 filed December 10, 1956, now Patent No. 2,935,905, issued May 10, 1960, and entitled Collet Foot Attachment for Pneumatic Power Drill. This foot carries an expandable collet sleeve insertable into a locating hole in a template or drill jig. The depth stop consists of a drill guide and depth control sleeve which is slidable in the collet sleve. In use, the forward end of the stop sleeve engages the work surface and the rear end of the stop sleeve carries means engageable with a depth control means on the drill body to limit forward movement of the drill bit in the stop sleeve. The invention is especially adapted for drilling in curved work surfaces since the depth stop or sleeve engages the work surface immediately adjacent to the contact of the latter with the drill bit.

A better understanding of the invention may be had from the following detailed description thereof taken in connection with the annexed drawings wherein:

FIG. 1 is a view in perspective of the present depth control means mounted on a portable collar drill of the type disclosed in the aforementioned copending application;

FIG. 2 is a section through the depth control means showing the parts thereof in their normal inoperative positions;

FIG. 3 is a view similar to FIG. 2 but showing the parts of the depth control means in one position of operation;

FIG. 4 is a view looking in the direction of arrow 4 of FIG. 2; and

FIG. 5 illustrates a modification to the depth control means of FIGS. 1–4 which permits adjustment of the drill depth.

The depth control illustrated will be seen to comprise a main body part or pressure foot 10 which is mounted on the forward end of the ram or piston rod 12 of a portable power drill 14 of the type disclosed in the aforementioned copending application. The foot 10 is mounted on the ram 12 by providing it with a bore 16 to receive the forward end of the ram and with means 18 to clamp the foot to the ram. As described in the prior application, the drill tool 14 comprises a trigger-actuated means for moving the ram 12 from its normal extended position of FIG. 1 to a retracted position (FIG. 3) adjacent the body of the tool and thereafter returning the ram to its normal extended position. This return of the ram to its extended position is effected by depression of a depth control plunger or stop 20 on the tool body.

Foot 10 has a forward face 22 presentable toward a workpiece. This face has a raised circular portion 24 located at one end of the foot and adapted to seat on a drill jig 26, in the manner shown in FIGS. 2 and 3. Extending through the foot 10, concentric with this circular portion, is a bore 27. The upper end of this bore, as viewed in FIGS. 2 and 3, is counterbored at 28.

Extending slidably through the bore 27 and extending forwardly of the foot 10 is a split collet sleeve 30. The inner end of this sleeve has an outwardly extending flange or shoulder 32 engageable with the shoulder 34 at the juncture of the bore 27 and counterbore 28 to limit forward movement of the collet sleeve 30 in the foot. The collet sleeve is urged to its forward limiting position of FIG. 2 by a spring 36. This spring acts between the collet sleeve flange 32 and one end of an arm 38 which overlies the rear end of the counterbore 28. The other end of arm 38 extends through a slot 40 in the ram 12 and is connected to an axially movable rod 42 within the ram.

As described in my prior application, when the trigger (not shown) of the tool 14 is actuated, the rod 42 is initially pulled to the rear, that is, upwardly in FIG. 2, within the ram. Subsequently, the ram and rod are moved rearwardly as a unit. The initial rearward movement of the rod 42 in the ram 12 expands the collet sleeve 30 in the following way.

Extending slidably through the collet sleeve 30 is a hollow tubular mandrel 44. The rear end of this mandrel is attached to the arm 38 so as to be pulled rearwardly with the arm. The forward end of the mandrel 44 has a circumferential relief 46 and a forward tapered face 48. The individual fingers of the collet sleeve 30 have inward extensions 50. In the normal position of the parts shown in FIG. 2, these extensions are located in the relief 46 and the collet sleeve is in its contracted condition. When the arm 38 is moved to the rear with rod 42, the mandrel 44 is pulled rearwardly in the collet sleeve 30. The forward tapered mandrel face 48 is thereby moved against the collet finger extensions 50 to expand the fingers radially outward. Spring 36 acting between the arm 38 and collet sleeve 30 allows the latter to be drawn to the rear during this expansion of the collet to effect firm clamping of the pressure foot 10 against the jig 26.

Axially slidable within the mandrel 44 is a combination cutter or drill guide and depth gauge or stop sleeve 52. The forward end of this sleeve is engageable with a workpiece 54 and is provided with chip-clearance openings 56.

Fixed within the rear end of the sleeve 52 is a sleeve bearing 58 to slidably and rotatably receive the cutting bit 60 of the tool 14. This cutting bit is fixed on the end of a rotary spindle 62 which is rotatably mounted in and extends forwardly of the body of the drill 14 parallel to the ram 12.

Fixed to the end of the stop sleeve 52 is a crosspiece 64. As shown in FIG. 2, this crosspiece has a bore to receive the rear end of the stop sleeve. Slidably received in bores 66 at opposite ends of the crosspiece 64 are a pair of guide rods 68. The forward ends of these rods are fixed in a pair of lateral ears 70 on the pressure foot 10. Circling these guide rods are tension springs 72. The ends of the tension springs are attached to the ears 70 and opposite ends of the crosspiece 64 by clips 74. Springs 72, accordingly, urge the crosspiece 64 and the stop sleeve 52 forwardly in the foot 10.

One end of the crosspiece 64 overlies the depth control plunger 20 on the tool 14. During operation of the tool, the crosspiece 64 retracts rearwardly with the ram 12 and eventually the overlying end of the bar acts as a stop which engages and depresses the plunger 20 to return the parts to their normal positions.

In use, the forward extending end of the collet sleeve 30 is inserted into a guide hole 76 in the drill jig 26. During this insertion of the collet sleeve, the forward end of the stop sleeve 52 engages the work 54 and is thus held stationary while the collet sleeve is fully seated in the hole 76. Springs 72 are thereby tensed to firmly hold the stop sleeve against the work.

When the trigger of the tool 14 is actuated, the rod 42 is first pulled rearwardly in the ram 12, as previously mentioned. This pulls the mandrel 44 rearwardly in the collet sleeve 30 to expand the latter and firmly clamp the pressure foot or body part 10 against the upper face of drill jig 26. Immediately thereafter, the ram is retracted into the drill body. Since the drill jig 26 is fixed, of course, the ram and pressure foot thereon remain stationary while the drill body is moved forwardly toward the drill jig. This forward movement of the drill body results in forward axial movement of the drill bit 60 in the combination cutter guide and depth control sleeve 52 and penetration of the drill bit into the work 54.

Eventually, the depth control plunger 20 on the tool engages the crosspiece 64 attached to the stop sleeve 52. As a result, the plunger 20 is depressed, the feed mechanism within the drill is reversed, and the parts are returned to their normal positions. It will be seen that the spacing A between the upper or inner face of the crosspiece 64, which engages the plunger 20, and the forward end of the stop sleeve 52, which engages the workpiece 54, can be accurately established and remains fixed. Since the depth of penetration of the drill bit 60 into the work is related to and determined by this spacing, it follows that accurate drill depth control is achieved by the depth stop sleeve 52. If adjustment of the drill depth is desired, the crosspiece 64 of the depth sensing pressure foot may carry a threaded, adjustable stop 78 to actuate the depth control plunger 20 on the tool, as shown in FIG. 5.

An obvious advantage of the invention is its ability to effect accurate drilling depth control on a workpiece which is either flat or is curved as is the workpiece 54 in the drawings. This is due, of course, to the fact that the depth sensing or stop sleeve 52 contacts the workpiece immediately adjacent to the contact of the drill bit 60 with the workpiece. In other words, the present depth control means gauges the drill depth directly from the portion of the curved work surface to be drilled rather than from some other point of the work surface which would be at a different level because of the curvature of the surface.

It will be immediately evident that the present depth control means is not limited to use in the clamping foot illustrated wherein the foot is clamped by means of a collet sleeve which surrounds the depth sensing or stop sleeve. For example, the present depth control means may obviously be incorporated in a suction grip foot of the type shown in copending application Serial No. 703,237 filed December 13, 1957, now Patent No. 2,910,895, issued November 3, 1959, and entitled Power Tool With Suction Foot or in a collet foot of the type shown in copending application Serial No. 732,635 filed May 2, 1958, now Patent No. 2,909,949, issued October 27, 1959, and entitled Power Drill With Work Holding Device and Spacing Means. Also, it is clearly possible to adapt the present depth control means to use with a hand-fed drill motor.

Accordingly, there has been described and illustrated a depth control means for portable power drills and the like which is fully capable of attaining the objects and advantages preliminarily set forth.

What is claimed is:

1. A power tool comprising a body, a spindle member rotatable in and extending forwardly of the body, a cutting bit on the forward end of said spindle member, a tool supporting foot member mounted on and located forwardly of said body for supporting the tool in fixed relation to a workpiece, power operated means on the body for effecting relative forward and rearward movement of said members along direction lines parallel to the axis of said spindle member, said power operated means, including a depressible depth control stop which moves forward with said spindle member relative to said foot member and means for deactivating said power operated means to terminate relative forward movement of the spindle member with respect to said foot member in response to depression of said stop, and a depth gauge member of fixed length on said tool having freedom of endwise movement parallel to the spindle member, said gauge member having a forward end engageable with the surface of the workpiece and a rear end operatively engageable with said stop to depress the latter at a predetermined distance of axial extension of the cutting bit beyond the forward end of said depth gauge member.

2. The subject matter of claim 1 wherein said spindle member is restrained against axial movement on the tool body and said power operated means moves said foot axially of the spindle member toward and away from said body, and said stop is carried on said body.

3. A power tool comprising a body, a spindle rotatably mounted in and extending forwardly of the body, a cutter bit on the forward end of the spindle, an axially extensible and retractable ram mounted in and extending forwardly of the body parallel to the spindle, a transverse foot on the forward end of the ram for supporting the tool in fixed relation to the workpiece, a depth gauge sleeve slidably guided in and extending forwardly of said foot for contact with the surface of the workpiece, said spindle extending slidably and rotatably through said sleeve, power operated means in said body for extending and retracting said ram including a depth control stop on the forward end of said body which is rearwardly depressible to deactivate said power operated means to terminate rearward movement of the ram, and means on the rear end of said sleeve for engaging and depressing said stop upon a predetermined distance of extension of the cutting bit beyond the forward end of said sleeve whereby to limit the maximum depth of penetration of the cutting bit into the workpiece.

4. The subject matter of claim 3 wherein said means for depressing the stop is adjustable to vary said predetermined distance.

5. The subject matter of claim 3 including an expansible collet sleeve about said depth gauge sleeve and extending forwardly of said foot, a tubular mandrel slidable in the collet sleeve and slidably receiving said depth gauge sleeve, said mandrel having an external surface for expanding said collet sleeve upon rearward movement of the mandrel in the collet sleeve, and means operated by said power operated means for moving said mandrel rearwardly in the collet sleeve piror to retraction of the ram.

6. The subject matter of claim 3 including spring means acting between said foot and depth gauge sleeve for urging the latter forwardly.

7. For use on a power tool of the character described, an elongate foot having a rear side and a forward face presentable toward a workpiece, means on one end of the foot for securing the latter to the tool, the other end of said foot having a bore on an axis transverse to said face, an expansive collet sleeve in said bore and extending forward of said face, a tubular mandrel slidable in said sleeve and having external surface means for expanding the sleeve upon rearward movement of the mandrel in the sleeve, means on the rear end of the mandrel for moving the latter, a depth gauge sleeve slidable in said mandrel and extending forwardly of the latter for engaging the workpiece, a cross bar rigid on the rear end of the depth gauge sleeve, spring means acting between said cross bar and foot for urging the depth gauge sleeve forwardly, and stop means on said bar for engaging the tool.

8. The subject matter of claim 7 wherein said stop means comprises an adjustable, rearwardly extending stop.

9. A power tool comprising a body, a spindle rotatable in and extending forwardly of the body, a cutting bit on the forward end of said spindle, a tool supporting foot mounted on and located forwardly of said body for supporting the tool in fixed relation to a workpiece, power operated means on the body for effecting forward and rearward axial movement of the spindle with respect to said foot when the latter is stationarily positioned with respect to the workpiece, including a rearwardly actuable stop which moves forward with said spindle relative to said foot and is rearwardly actuable for deactivating said power operated means to terminate relative forward movement of said spindle, and a depth gauge sleeve slidable on said spindle having a forward end engageable with the surface of the workpiece and a rear end operatively engageable with said stop to actuate the latter at a predetermined distance of axial extension of the cutting bit beyond the forward end of said depth gauge member.

References Cited in the file of this patent

UNITED STATES PATENTS

| | | |
|---|---|---|
| 2,794,353 | Bashlow et al. | June 4, 1957 |
| 2,839,953 | Hanger | June 24, 1958 |
| 2,868,044 | Chaffee et al. | Jan. 13, 1959 |